United States Patent
Höfig et al.

(10) Patent No.: US 11,144,379 B2
(45) Date of Patent: Oct. 12, 2021

(54) RING-CLOSURES IN FAULT TREES

(71) Applicant: Siemens Industry Software NV, Leuven (BE)

(72) Inventors: Kai Höfig, Munich (DE); Jonathan Menu, Wugmaal (BE); Marc Zeller, Munich (DE)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 225 days.

(21) Appl. No.: 16/406,075

(22) Filed: May 8, 2019

(65) Prior Publication Data
US 2019/0354423 A1 Nov. 21, 2019

(30) Foreign Application Priority Data
May 15, 2018 (EP) .................................. 18172377

(51) Int. Cl.
*G06F 11/00* (2006.01)
*G06F 11/07* (2006.01)
*G05B 19/4155* (2006.01)

(52) U.S. Cl.
CPC ........ *G06F 11/079* (2013.01); *G05B 19/4155* (2013.01); *G06F 11/0736* (2013.01); *G06F 11/0751* (2013.01); *G06F 11/0793* (2013.01); *G05B 2219/42227* (2013.01)

(58) Field of Classification Search
CPC ............... G06F 11/079; G06F 11/0736; G06F 11/0751; G06F 11/0793
See application file for complete search history.

(56) References Cited

U.S. PATENT DOCUMENTS

| 4,870,575 A * | 9/1989 | Rutenberg | G06F 30/20 716/136 |
| 10,095,813 B2 * | 10/2018 | Ramesh | G05B 23/0248 |
| 2002/0166082 A1 * | 11/2002 | Ramadei | G05B 23/0248 714/37 |
| 2005/0160324 A1 * | 7/2005 | Przytula | G06N 7/005 714/43 |
| 2013/0201817 A1 * | 8/2013 | Jiang | H04L 41/0659 370/217 |
| 2015/0088476 A1 * | 3/2015 | Guo | G06F 11/00 703/6 |
| 2015/0142402 A1 * | 5/2015 | Ramesh | G06F 30/20 703/7 |
| 2015/0168271 A1 * | 6/2015 | He | G05B 23/0251 702/183 |

(Continued)

FOREIGN PATENT DOCUMENTS

KR 20110001566 A 1/2011

OTHER PUBLICATIONS

IEC 61508 Standard "Functional safety of electrical/electronic/programmable safety related systems".

(Continued)

*Primary Examiner* — Jonathan D Gibson
(74) *Attorney, Agent, or Firm* — Schmeiser, Olsen & Watts LLP

(57) ABSTRACT

Modeling a multi-component control or actuator system using a fault tree is provided, which solves the problem of ring closures included in a fault tree. To identify ring closures, failure propagation paths are back-traced and is checked if the respective failure propagation path forms a ring closure.

16 Claims, 12 Drawing Sheets

(56) References Cited

U.S. PATENT DOCUMENTS

| | | | |
|---|---|---|---|
| 2016/0170868 A1* | 6/2016 | Hoefig | G06F 11/3684 |
| | | | 714/38.1 |
| 2019/0354423 A1* | 11/2019 | Hofig | G05B 19/4155 |

OTHER PUBLICATIONS

IEC 60812 "Analysis Techniques for System Reliability—Procedure for Failure Mode and Effects Analysis (FMEA)", 1991.

Vesely W E et al: "Fault Tree Handbook" US Nuclear Regulatory Commission (1981), NUREG-0492, Jan. 1981; 1981.

Kai Höfig, Joe Zhensheng Guo, and Amir Kazeminia. Streamlining architectures for integrated safety analysis using design structure matrices (dsms). Safety and Reliability: Methodology and Applications, 2014; 2014.

Joon-Eon Yang, Sang-Hoo Han, Jin-Hee Park, and Young-Ho An. Analytic method to break logical loops automatically in psa. Reliability Engineering & System Safety, 56(2):101-105, 1997; 1997.

Jonas Elmqvist and Simin Nadjm-Tehrani. Safety-Oriented Design of Component Assemblies using Safety Interfaces. For-mal Aspects of Component Software, 2006; 2006.

Philippe Cuenot, Loic Quran, Andreas Baumgart, Markus Oertel, Tilman Ochs, Christopher Ainhauser, and Lukas Bulwahn. Deliverable D331a2: Proposal for extension of meta-model for error failure and propagation analysis. Safe Automotive software architecture (SAFE), an ITEA2 project., 2013; 2013.

Ho-Gon Lim and Sang-Hoon Han. Systematic treatment of circular logics in a fault tree analysis. Nuclear Engineering and Design, 245 (Supplement C):172-179, 2012; 2012.

Kaiser, B., Liggesmeyer, P., Mäckel, O.: A new component concept for FTs. In: Proceedings of the 8th Australian Workshop on Safety Critical Systems and Software—vol. 33. pp. 37-46. SCS '03 (2003).

Zeller, M., Höfig, K.: INSiDER: "Incorporation of system and safety analysis models using a dedicated reference model." 2016 Annual Reliability and Maintainability Symposium (RAMS) (2016) pp. 1-6.

Möhrle, F., Zeller, M., Höfig, K., et al. "Automating compositional safety analysis using a failure type taxonomy for CFTs." Walls, L., Revie, M., Bedford, T. (eds.) Risk, Reliability and Safety: Innovating Theory and Practice: Proceedings of ESREL 2016. pp. 1380-1387 (2016).

Extended European Search Report dated Oct. 22, 2018 for Application No. 18172377.6.

\* cited by examiner

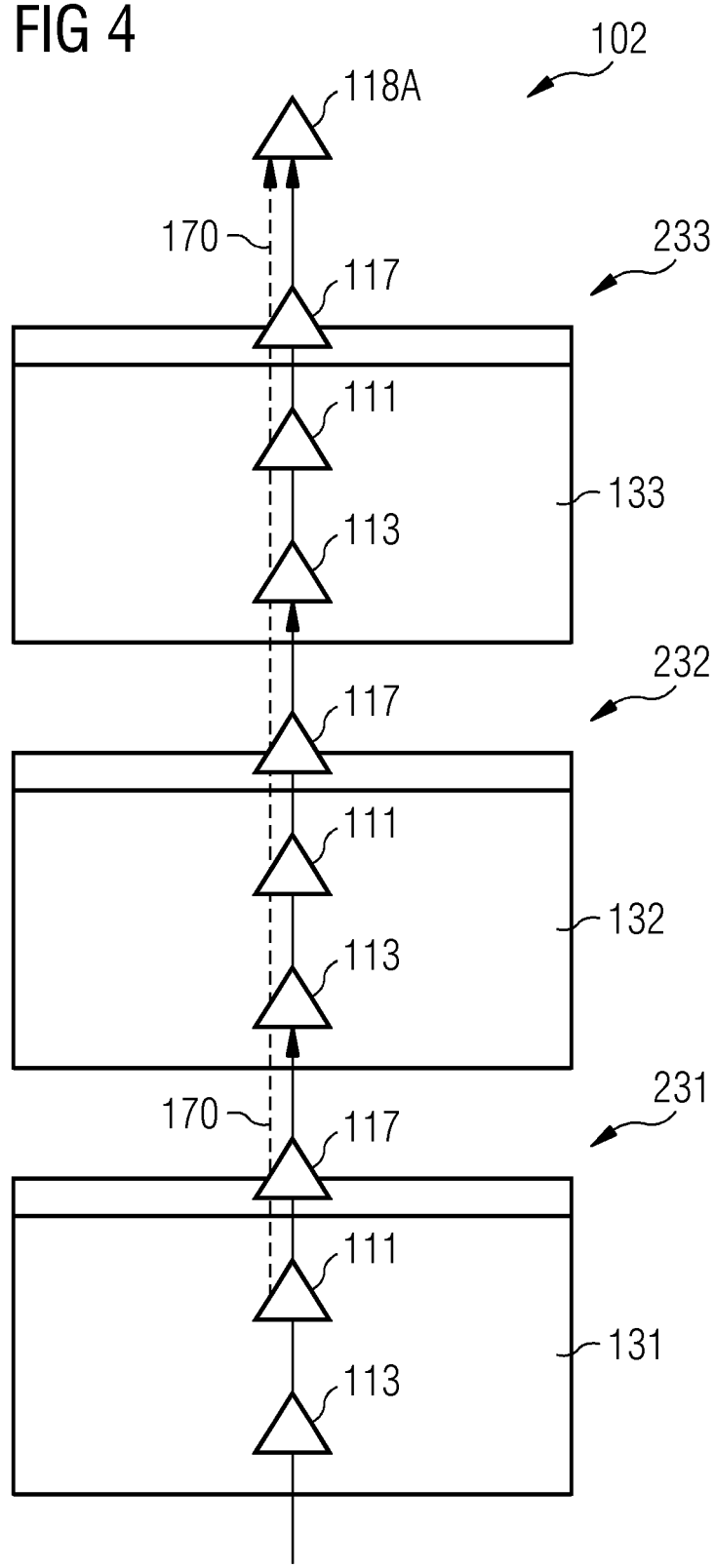

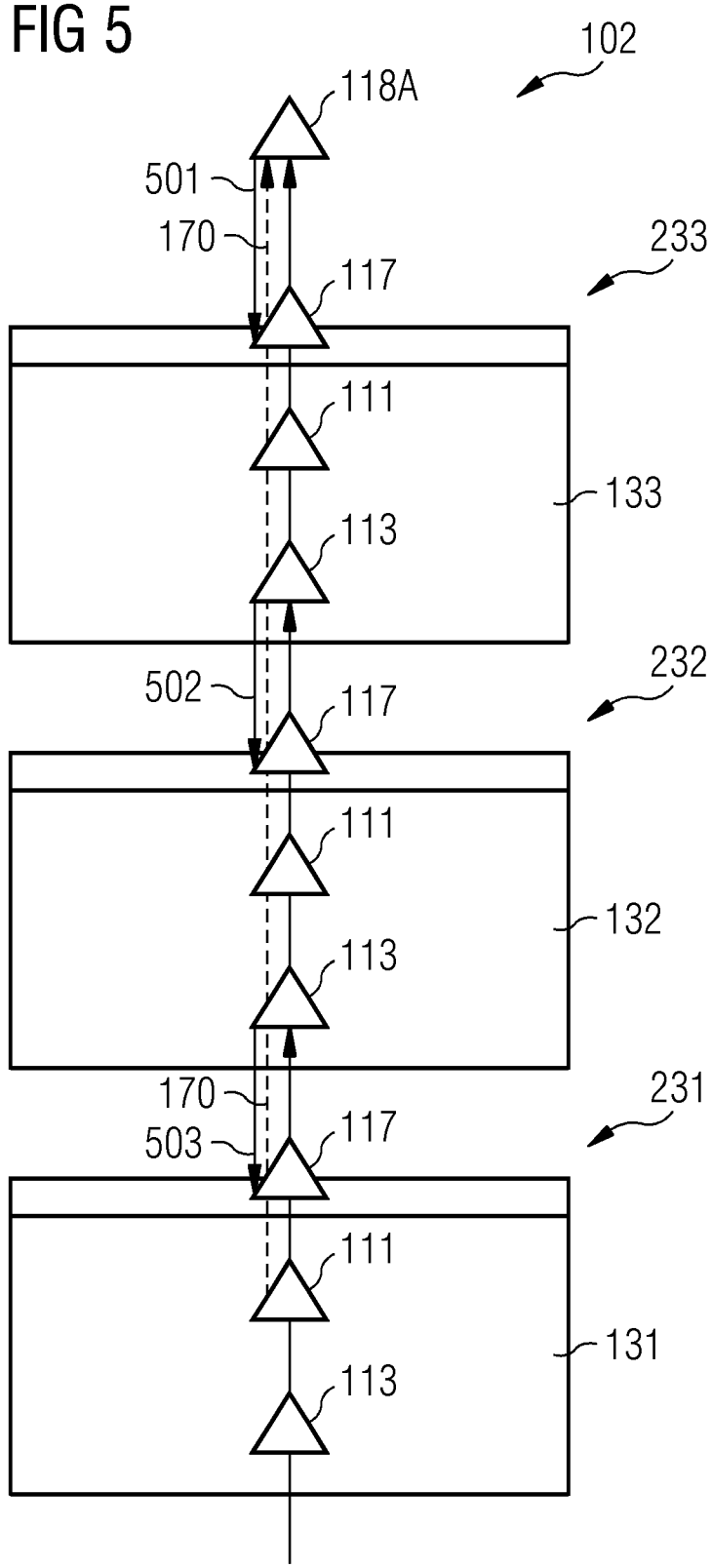

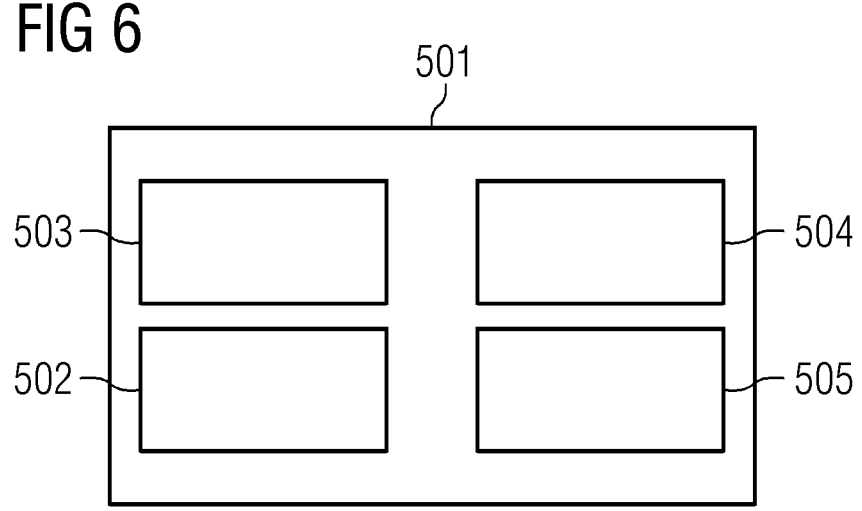
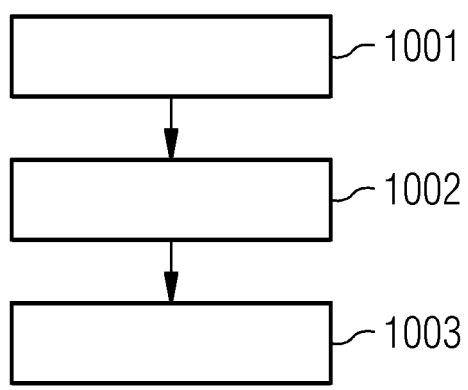

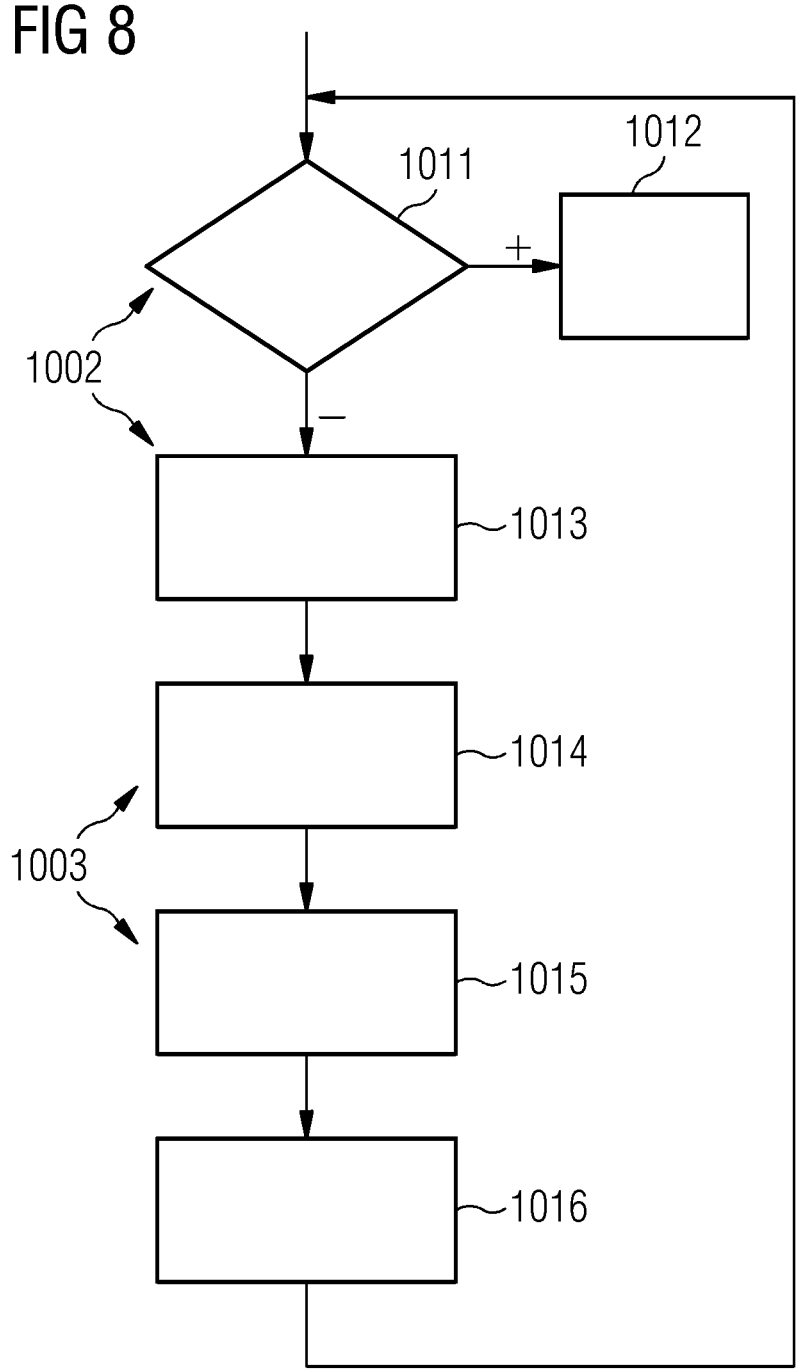

RING-CLOSURES IN FAULT TREES

CROSS-REFERENCE TO RELATED APPLICATIONS

This application claims priority to European Application No. 18172377.6, having a filing date of May 15, 2018, the entire contents of which are hereby incorporated by reference.

FIELD OF TECHNOLOGY

Various examples of embodiments of the invention generally relate to modeling a multi-component control or actuator system using a fault tree. Various examples of embodiments of the invention specifically relate to identifying ring closures in the fault tree.

BACKGROUND

The importance of safety-critical systems in many application domains of embedded systems, such as aerospace, railway, health care, automotive and industrial automation is continuously growing. Thus, along with the growing system complexity, also the need for safety assurance as well as its effort is increasing in order to guarantee the high-quality demands in these application domains. The aim of safety assurance is to ensure that systems do not lead to hazardous situations which may harm people or endanger the environment. In the application domains of safety-critical systems, the safety assurance is defined by the means of standards, see, e.g. the International Electrotechnical Commission (IEC) 61508 "Functional safety of electrical/electronic/programmable electronic safety related systems" (1998).

Traditionally, the assessment of a system in terms of safety is based on a bottom-up safety analysis approach, such as Failure Mode and Effect Analysis (FMEA), see IEC 60812 "Analysis Techniques for System Reliability-Procedure for Failure Mode and Effects Analysis (FMEA)" (1991). Alternatively, the assessment of a system according to reference implementations is based on top-down approaches such as the Fault Tree Analysis (FTA), see, e.g. Vesely, W. E., Goldberg, F. F., Roberts, N. H., Haas', D. F.: Fault Tree Handbook, US Nuclear Regulatory Commission (1981). By such techniques, it is possible to identify system failure states, their causes, and effects with impact on the system safety.

Often architectures of systems contain loops. An example for a loop is a closed loop controller (PID). Closed-loop control refers to the process in which a physical variable, e. g., ambient temperature, is to be brought to a particular value while being stabilized against disturbances. A feedback—obtained based on measuring an observable indicative of the physical variable—is used to set operation of an actuator influencing the physical variable. The controller is the component that acquires the actual value and derives a control signal form the difference between the set point and actual value. The controller then activates a final controlling element, e. g., heater, that compensates for the control deviation.

Since failure propagation models often use Boolean logic, e.g., to drive a fault tree (FT), loops are problematic. Because Boolean logic cannot contain loops in general, there are techniques to prevent loops in such models, e.g., as described in Kai Höfig, Joe Zhensheng Guo, and Amir Kazeminia. *Streamlining architectures for integrated safety analysis using design structure matrices (dsms). Safety and Reliability: Methodology and Applications,* 2014. For applications where failure propagation models are composed automatically, e.g. when the architecture is generated, such preventive technologies cannot help. Such loops often cannot be prevented, they simply develop during the composition of a system from existing components and existing parts of failure propagation models. Therefore, a technique is required that is able to deal with loops in failure propagation models that use Boolean logic.

In Joon-Eon Yang, Sang Hoo Han, Jin-Hee Park, and Young-Ho An. *Analytic method to break logical loops automatically in psa. Reliability Engineering & System Safety,* 56(2): 101-105, 1997, the authors automatically break open loops analytically. They use a top-down expansion of the Boolean equation until they detect a loop by addressing the same structural element in a conjunction twice. The term is then removed from the equation, arguing that a larger multiplication of basic events results in a smaller portion of the overall reliability. The result may become inexact and optimistic and the failure grows with the number of loops being detected.

In Jonas Elmqvist and Simin Nadjm-Tehrani. *Safety-Oriented Design of Component Assemblies using Safety Interfaces. Formal Aspects of Component Software,* 2006, the loops are also removed from failure propagation models, but this work only addresses one-dimensional loops with only one entry and one exit point. Thus, it is not possible or only possibly to a limited degree to break open arbitrary loops that are multi-dimensional with multiple entry and exit points also into other loops.

In Philippe Cuenot, Loic Quran, Andreas Baumgart, Markus Oertel, Tilman Ochs, Christopher Ainhauser, and Lukas Bulwahn. *Deliverable D331a2: Proposal for extension of meta-model for error failure and propagation analysis. Safe Automotive software architecture (SAFE), an ITEA2 project.,* 2013, the authors also use a top-down method to expand the Boolean formula through all existing loops recursively. The stop this recursion after a step where further unrolling loops does not change the cut sets of the Boolean equation any more. It is assumed that this is a valid criteria for the termination of the algorithm, since the number of cut sets is finite. There is no proof that unrolling will not alternate between two solutions. Also, the number of cut sets grows exponential and so does the algorithm, which should be in $O(n^n)$.

Another approach can be found in Ho-Gon Lim and Sang-Hoon Han. *Systematic treatment of circular logics in a fault tree analysis. Nuclear Engineering and Design,* 245 (Supplement C): 172-179, 2012 where the initial condition of a system is investigated to treat circular logic. An initial condition of a circular logic is the point where the loop is closed. If the next gate is of the type fails to run or fails to start, the circular logic is treated differently. These conditions indicating whether a supporting system is in standby and needs to be started to fulfill its function or if a system is running and fails to perform its operation. This knowledge is required for all gates of a fault tree logic that close a loop to automatically treat the circular logic using the algorithm. This limits the ability to fully automate the process of removing circular logic form automatically generated fault trees.

SUMMARY

Therefore, a need exists for advanced techniques of analyzing safety-critical systems. In particular, a need exists for advanced techniques of identifying ring closures in FTs.

According to an example, a computer-implemented method includes modeling a multi-component control or actuator system using a FT. The FT includes a plurality of elements. The plurality of elements is associated with components of the system. The FT also includes a plurality of interconnections between elements of the plurality of elements. The plurality of interconnections is associated with functional dependencies between the components. The method also includes back-tracing a plurality of failure propagation paths from an output of the FT towards one or more inputs of the FT. The method also includes, for each one of the plurality of failure propagation paths: checking if the respective failure propagation path forms a ring closer and, in the affirmative, replacing the ring closure by a predefined expression.

A device includes at least one processor. The at least one processor is configured to execute a method. The method includes modeling a multi-component control or actuator system using a FT. The FT includes a plurality of elements. The plurality of elements is associated with components of the system. The FT also includes a plurality of interconnections between elements of the plurality of elements. The plurality of interconnections is associated with functional dependencies between the components. The method also includes back-tracing a plurality of failure propagation paths from an output of the FT towards one or more inputs of the FT. The method also includes, for each one of the plurality of failure propagation paths: checking if the respective failure propagation path forms a ring closer and, in the affirmative, replacing the ring closure by a predefined expression.

A computer program product or computer program includes program code which may be executed by at least one processor. Executing the program code by the at least one processor may cause the at least one processor to perform a method. The method includes modeling a multi-component control or actuator system using a FT. The FT includes a plurality of elements. The plurality of elements is associated with components of the system. The FT also includes a plurality of interconnections between elements of the plurality of elements. The plurality of interconnections is associated with functional dependencies between the components. The method also includes back-tracing a plurality of failure propagation paths from an output of the FT towards one or more inputs of the FT. The method also includes, for each one of the plurality of failure propagation paths: checking if the respective failure propagation path forms a ring closer and, in the affirmative, replacing the ring closure by a predefined expression.

It is to be understood that the features mentioned above and features yet to be explained below can be used not only in the respective combinations indicated, but also in other combinations or in isolation, without departing from the scope of embodiments of the present invention. Features of the above-mentioned aspects and embodiments may be combined with each other in other embodiments.

BRIEF DESCRIPTION

Some of the embodiments will be described in detail, with references to the following Figures, wherein like designations denote like members, wherein:

FIG. 1 schematically illustrates a FT according to various examples;

FIG. 2 schematically illustrates a component FT according to various examples;

FIG. 3 schematically illustrates a multi-component system according to various examples;

FIG. 4 schematically illustrates a component FT of the multi-component system of FIG. 3 according to various examples;

FIG. 5 schematically illustrates component FT of the multi-component system of FIG. 3 according to various examples and further illustrates back-tracing of a failure propagation path by expanding multiple links according to various examples;

FIG. 6 schematically illustrates a device according to various examples;

FIG. 7 is a flowchart of a method according to various examples;

FIG. 8 is a flowchart of a method according to various examples;

Figure 9:
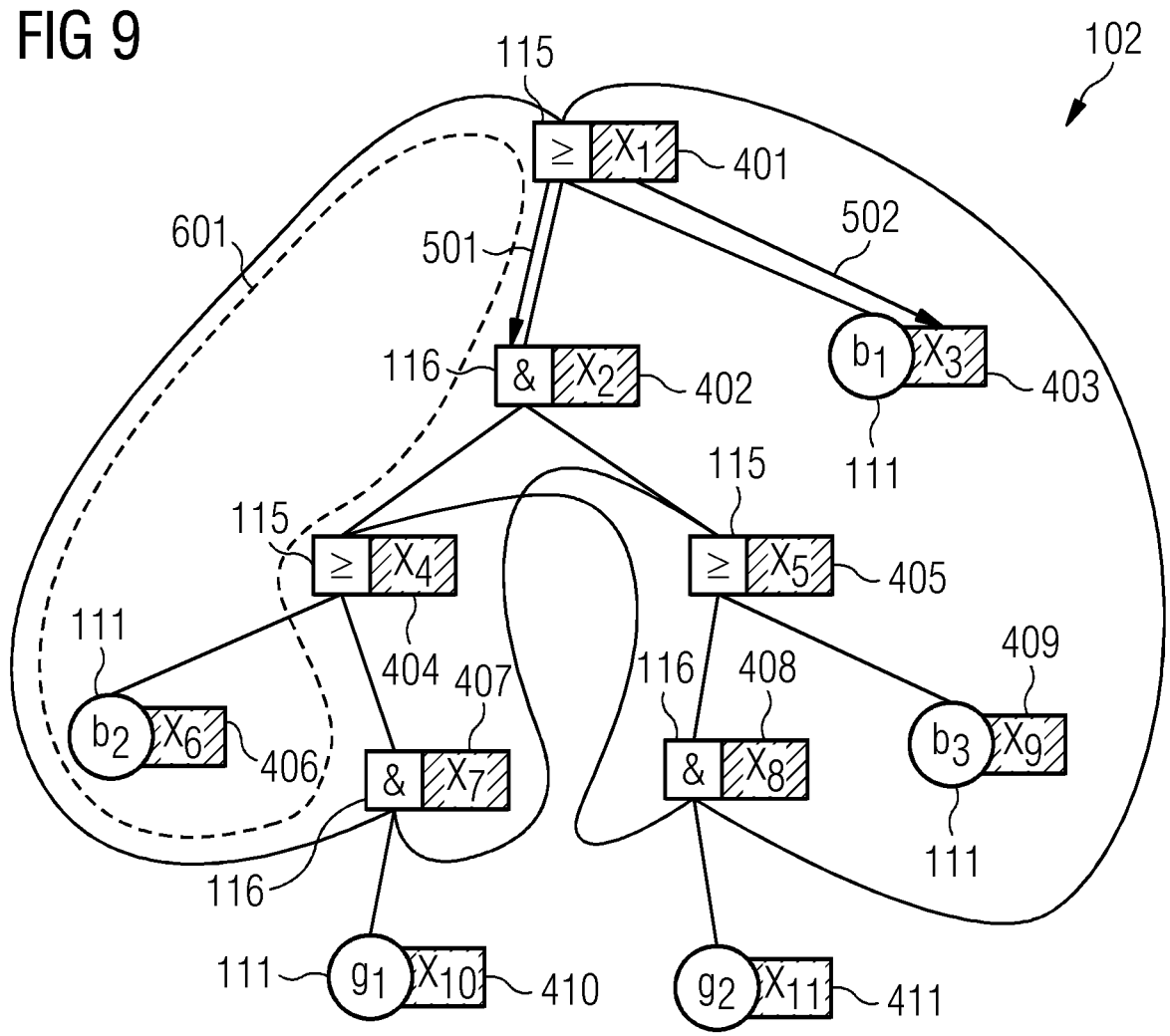
Figure 10:
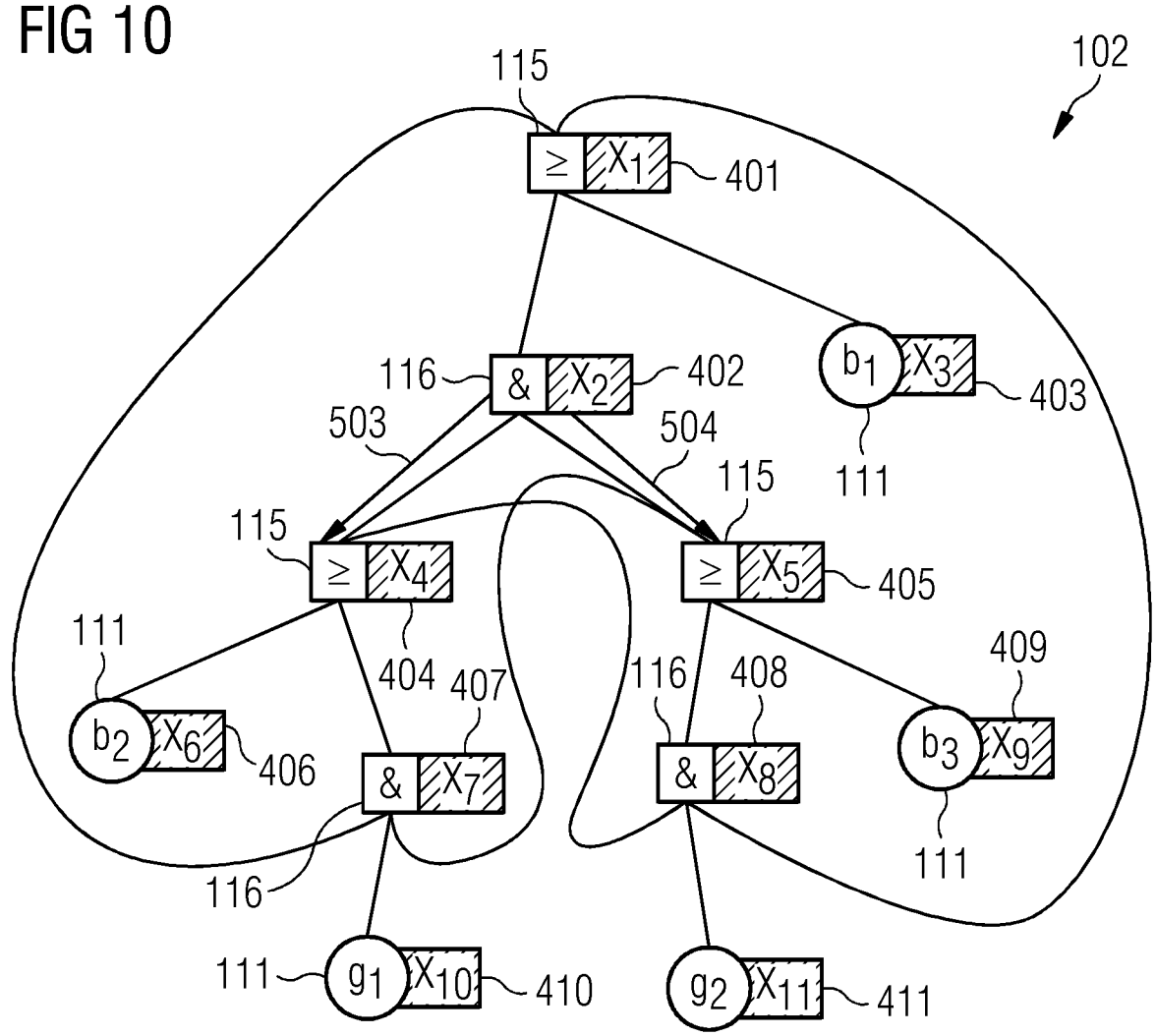
Figure 11:
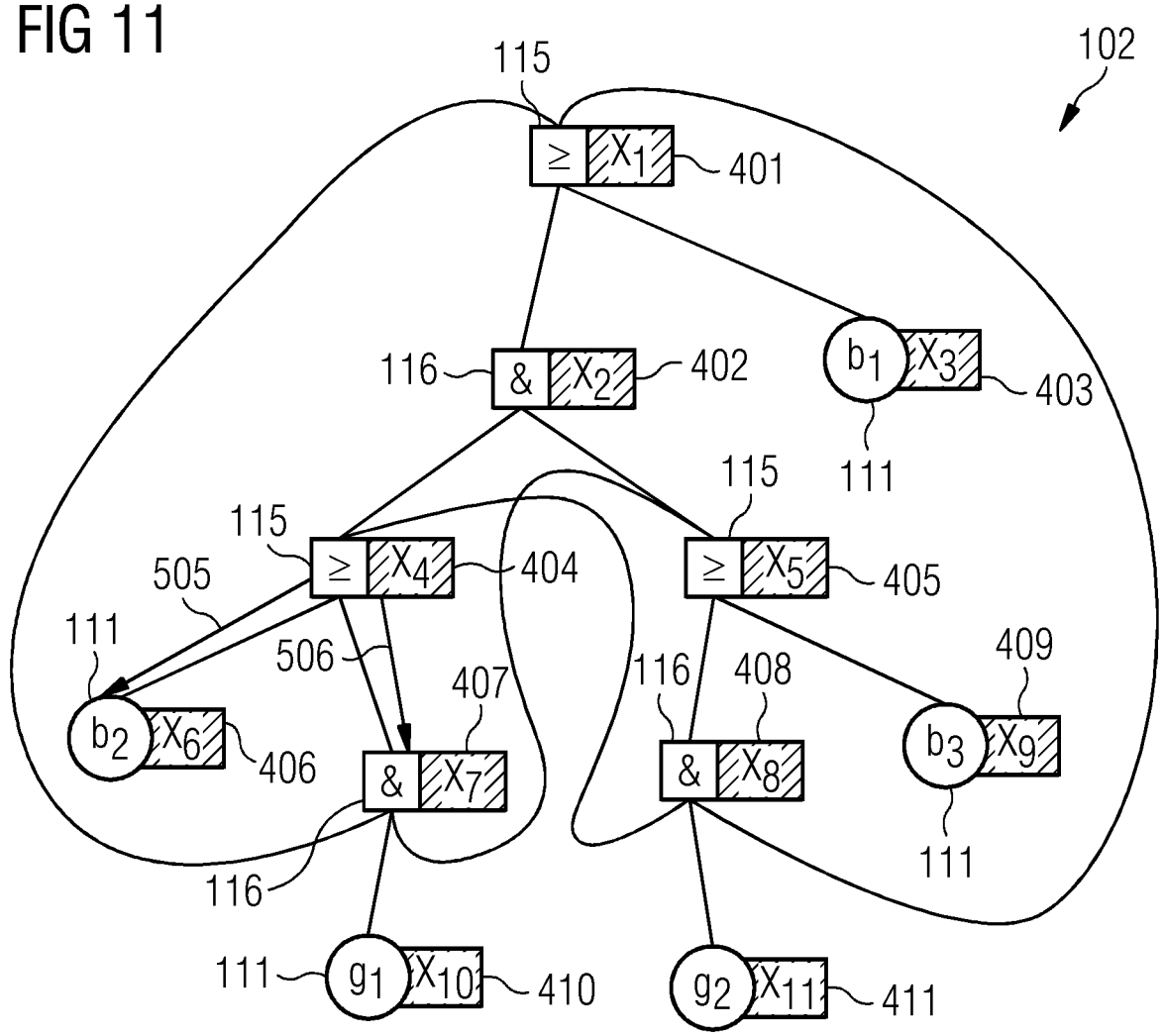
Figure 12:
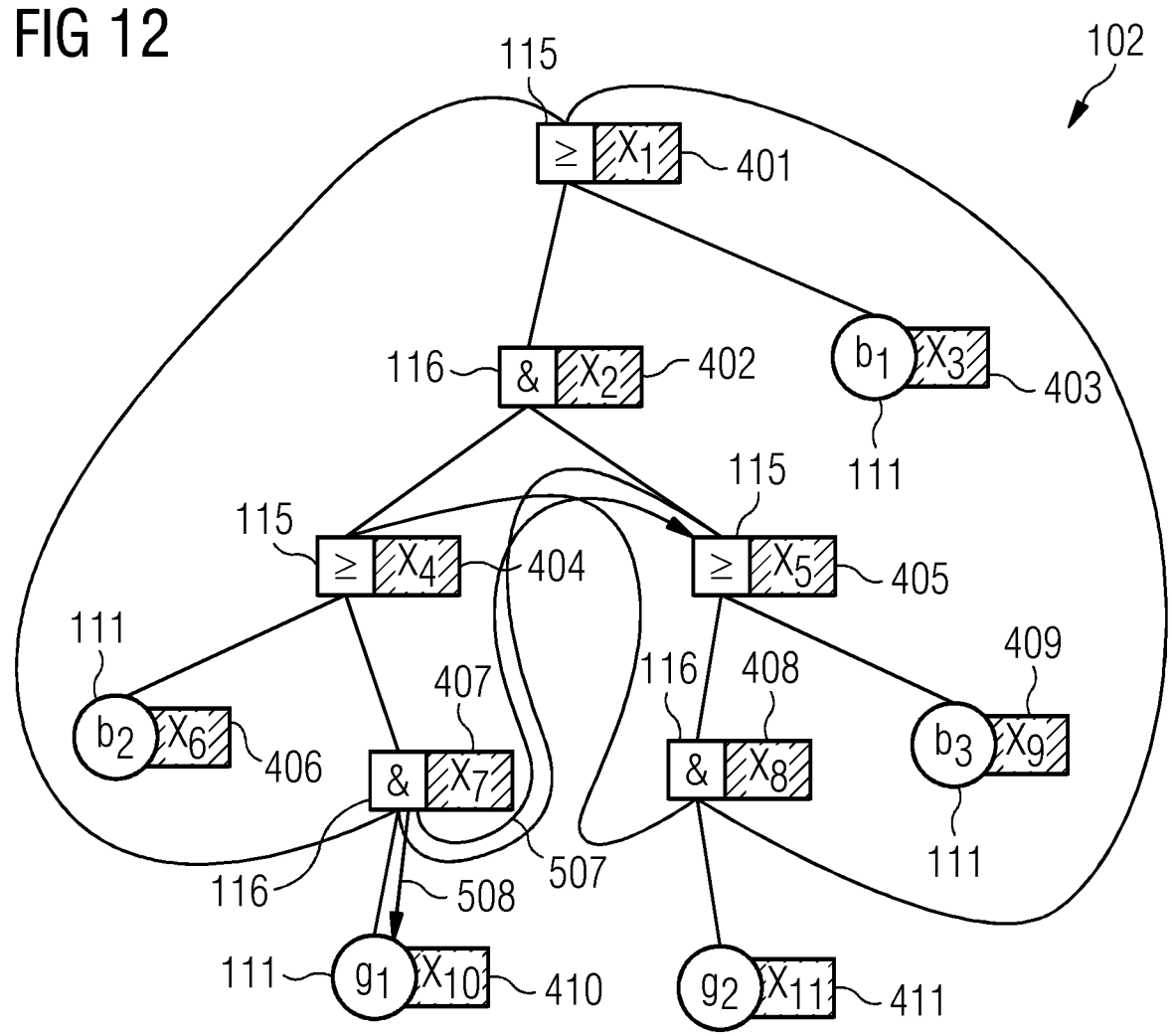
Figure 13:
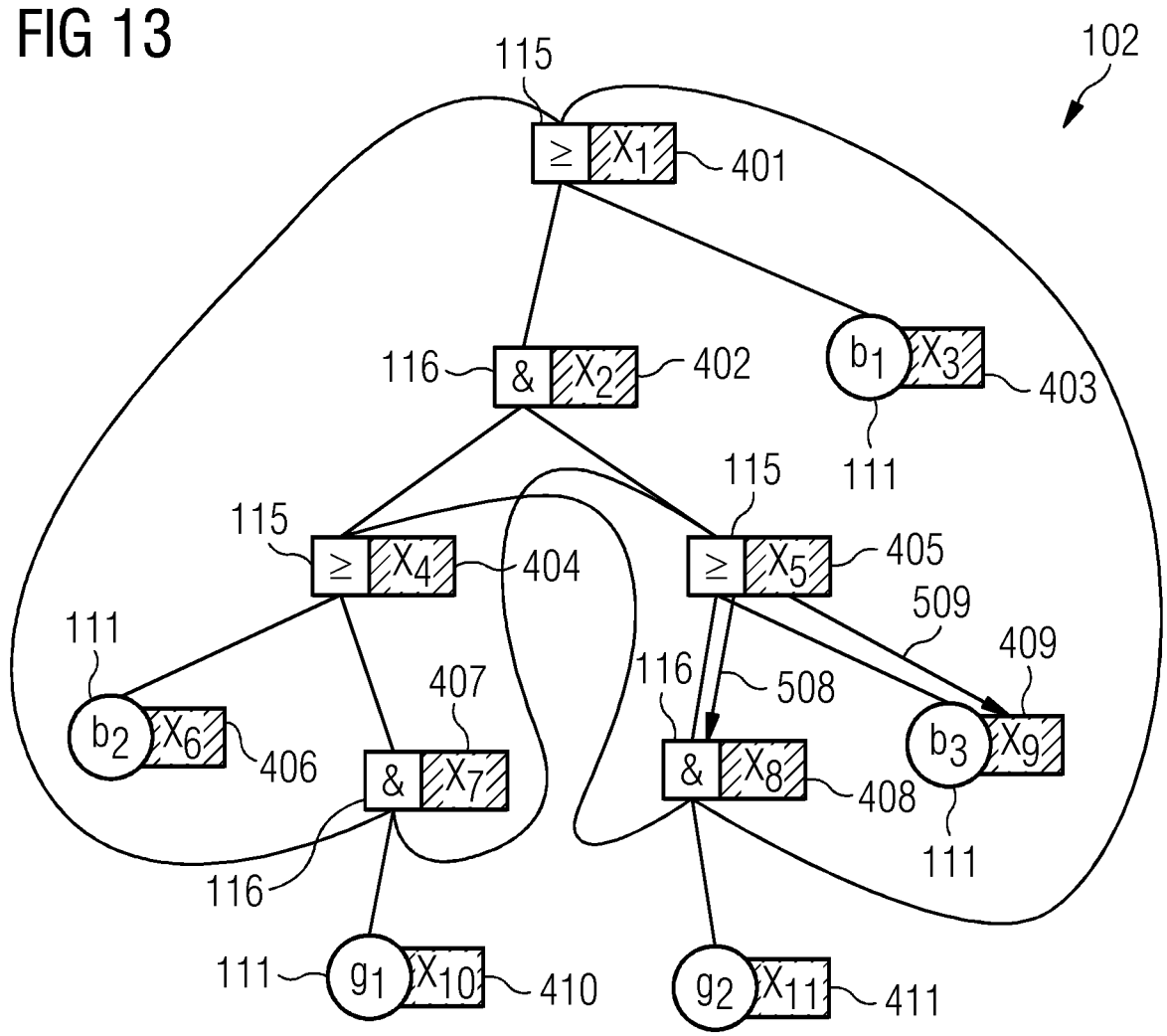
Figure 14:
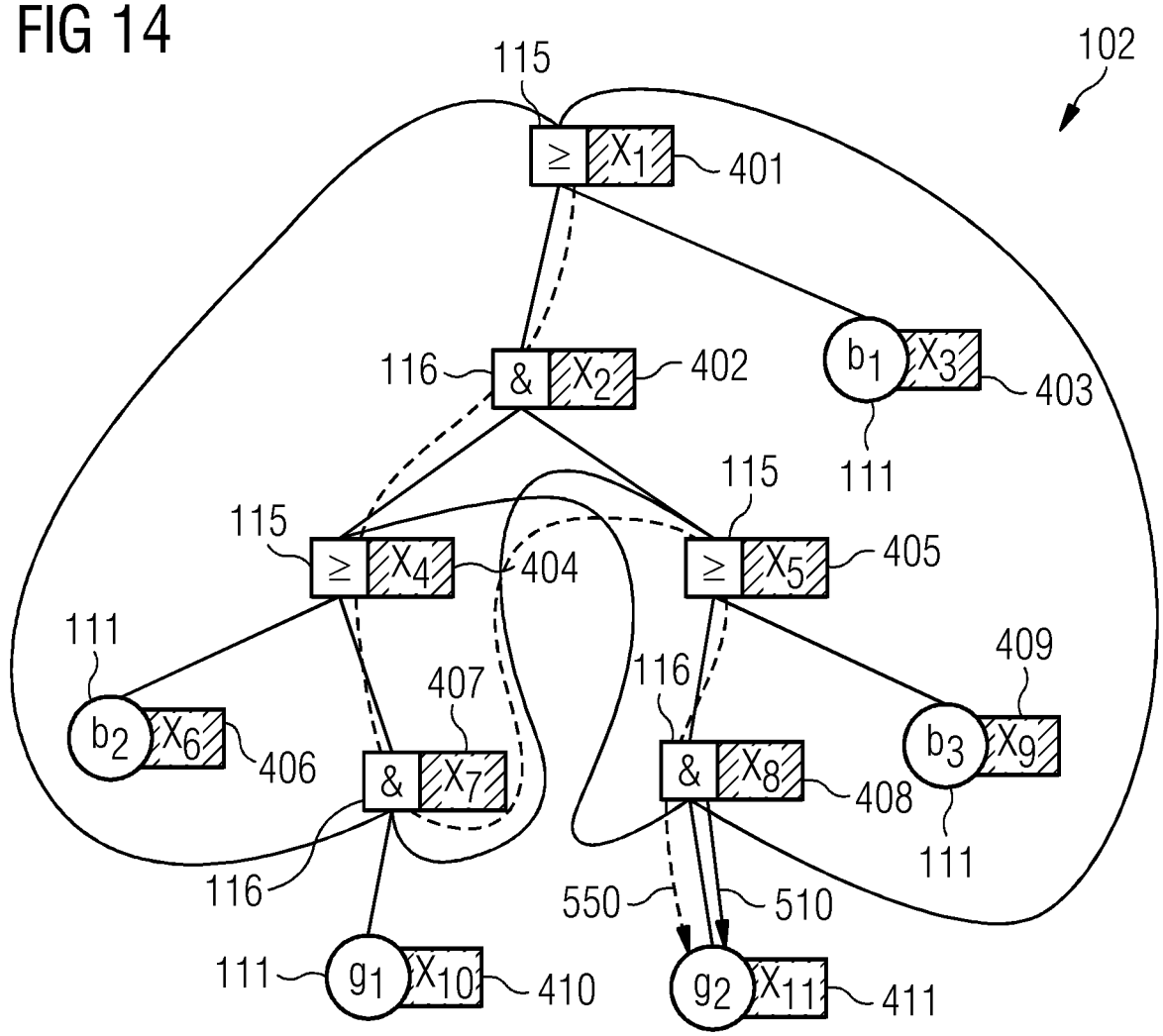

FIG. 9 schematically illustrates a first example of a CFT and back-tracing of a failure propagation path;

FIG. 10 schematically illustrates a second example of a CFT and back-tracing of a failure propagation path;

FIG. 11 schematically illustrates a third example of a CFT and back-tracing of a failure propagation path;

FIG. 12 schematically illustrates a fourth example of a CFT and back-tracing of a failure propagation path;

FIG. 13 schematically illustrates a fifth example of a CFT and back-tracing of a failure propagation path; and FIG. 14 schematically illustrates a sixth example of a CFT and back-tracing of a failure propagation path.

DETAILED DESCRIPTION

In the following, embodiments of the invention will be described in detail with reference to the accompanying drawings. It is to be understood that the following description of embodiments is not to be taken in a limiting sense. The scope of embodiments of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques for safety assurance are described. Safety assurance of multi-component systems such as actuator and control systems help to increase safety in operating such systems.

Hereinafter, techniques are described to reliably and computationally inexpensively detect ring closures in FTs. For this, a plurality of failure propagation paths are back-traced from an output of the FT towards one or more inputs of the FT. Then, for each failure propagation path, a check can be made if the respective failure propagation path forms a ring closure.

Then, if a ring closure is identified, it may be possible to take an appropriate counter measure to mitigate negative effects of the ring closure on the safety assurance.

For example, the ring closure can be replaced by a predefined expression. The predefined expression may be selected from a plurality of candidate predefined expression.

The predefined expression may not be derived from the architecture of the modeled system. Rather, the predefined expression may be a generic expression which avoids the ring closure and still, to some larger or smaller extent, appropriately models the failure behavior of the system.

Generally, the techniques described herein may find application in various kinds and types of safety-critical systems. For example, the techniques described herein may find application in multi-component control or actuator systems. Such control or actuator systems may provide control functionality or activation functionality for certain machines. Some elements of multi-component safety-critical systems may be implemented as hardware while some components may alternatively or additionally be implemented using software. It is possible that the safety-critical systems for which the techniques are employed include an output which provides an actuator force or a control signal for actuating or controlling one or more machines. Specific examples of safety-critical systems which may benefit from the techniques described herein include, but are not limited to: electronic circuitry including active and/or passive electronic components such as transistors, coils, capacitors, resistors, etc.; drivetrains for vehicles such as trains or passenger cars or airplanes; assembly lines including conveyor belts, robots, movable parts, control sections, test sections for inspecting manufactured goods (backend testing); medical systems such as imaging systems including magnetic resonance imaging or computer tomography, particle therapy systems; power plants; etc.

As a general rule, in the various examples described herein, different kinds and types of FTs may be used. An example implementation of a FT that may be relied upon in the techniques described herein includes a component FT (CFT). For sake of simplicity, hereinafter, various examples are described in the context of CFTs—while, generally, also a FT may be employed.

CFTs are described, e.g., in Kaiser, B., Liggesmeyer, P., Mäckel, O.: A new component concept for FTs. In: Proceedings of the 8th Australian Workshop on Safety Critical Systems and Software—Volume 33. pp. 37-46. SCS '03 (2003). CFTs provide a model- and component-based methodology for FTA, which supports a modular and compositional safety analysis strategy. The CFT includes a plurality of elements. The elements are associated with components of the system. The CFT also includes a plurality of interconnections between the elements. The interconnections are associated with functional dependencies between components of the system. Such functional dependencies may model input/output of control signals or flow of forces. The CFT may model an error behavior of the system. The error behavior of the system may be modeled by the CFT using approaches of hierarchical decomposition. Here, the overall behavior of the system can be predicted based on the individual behavior of components. In other words, the causal chain leading to an overall system behavior may be models by a causal chain of errors of components. The CFT may include Boolean links (sometimes also referred to as gates) between adjacent elements to model propagation of errors throughout the system, i.e., the interconnections. The CFT may model the system using a graph; here nodes of the graph may correspond to the elements and edges of the graph may correspond to the links.

Various techniques described herein are based on the finding that CFTs modeling a system using Boolean logic expressions can malfunction if they include ring closures. A ring closure may generally be present if an input value of an element of the CFT is derived from an output that is already included in the Boolean logic expression associated with that input value.

To motivate the techniques described herein, next, a formalism will be described which enables to handle such CFTs in a simple manner.

Every node in the FT is assigned on the variable. Some variables are terminal, if they are assigned to a basic event. If they are not terminal, the variables express the single Boolean formula of an AND or an OR gate.

Having the aforementioned formalism for circular logic, the following calculation rules are considered. A1, A2, A3, A4 are trivial and comply with the Boolean logic. A5 is a notation and does not affect the Boolean logic. Rules A6, A7 and A8 detect a ring closure and remove it by.

$$A1: X_1=(X_2 \lor X_3) \Rightarrow (X_1=X_2) \lor (X_1=X_3)$$

$$A2: X_1=(X_2 \lor X_1) \Rightarrow X_1=X_2$$

$$A3: X_1=(X_2 \land X_3) \Rightarrow (X_1=X_2) \land (X_1=X_3)$$

$$A4: X_1=(X_2 \land X_1) \Rightarrow (X_1=X_2)$$

$$A5: X_1=X_2, X_2=X_3 \Leftrightarrow X_{2,1}=X_3 \text{(Transitivity with memory)}$$

$$A6: X_1=X_1 \Leftrightarrow \Theta$$

$$A7: X_{i, \ldots, j, \ldots} = X_k \lor V X_j \Rightarrow X_{i, \ldots, j, \ldots} = X_k \lor \bot$$

$$A8: X_{i, \ldots, j, \ldots} = X_k \land X_j \Rightarrow X_{i, \ldots, j, \ldots} = X_k \land T$$

Here $\bot$ describes a logical FALSE and T describes a logical TRUE.

To motivate that A7 and A8 make sense, it is first necessary to understand A6. One way assumes that an expression like X=Y is tautology and that it is X=Y⇒T, but it's not a tautology. It's the smallest ring closure that exists. Now considering a specific example that X is a variable modeling the failure of a pump, than X=Y is nothing else as the statement: if a pump fails, the pump fails and if the pump does not fail, it does not fail. So, what can be deviated from that is not a tautology, but only a neutrality expressed throughout with Θ.

Since the neural element related to conjunction is T (logical TRUE) and the neutral element related to the disjunction is $\bot$ (logical FALSE), it is $$X_{i, \ldots, j, \ldots} = (X_k \lor X_j) \text{ (with } X_k=\phi \text{,any other logic)}$$

$$\overset{A1}{\Rightarrow} (X_{k,i, \ldots, j, \ldots} = \phi) \lor (X_{k,i, \ldots, j, \ldots} = X_j)$$

$$\overset{A5}{\Rightarrow} (X_k=X_i= \ldots =X_j= \ldots =\phi) \lor (X_j=X_i= \ldots =X_j= \ldots =X_j)$$

$$\overset{A5}{\Rightarrow} (X_k=\phi) \lor (X_j=X_i)$$

$$\overset{A6}{\Rightarrow} (X_k=\phi) \lor \Theta$$

$$\Rightarrow (X_k=\phi) \lor T$$

According to examples described herein, it is possible to apply A1-A5 to back-trace a plurality of failure propagation paths from an output of the CFT towards one or more inputs of the CFT. Each failure propagation path can then be expressed in a series of logical combinations of its elements, using A1-A5. Since all failure propagation paths of the CFT either end in a terminal node/basic event—i.e., an input of the CFT—or in a ring closure, the algorithm terminates. Since for n gates and basic events, each failure propagation path ends either in n steps in an input terminal or a ring closure. If there are n variables, the algorithm is thus of complexity $O(n^2)$.

Figure 1:
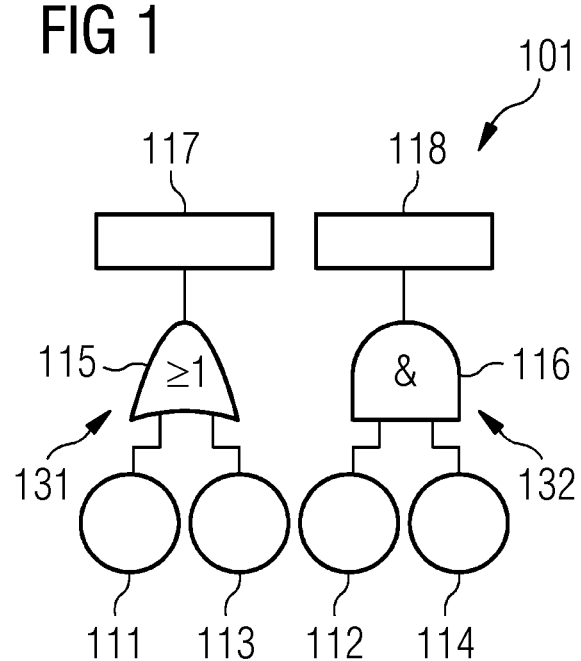

FIG. 1 illustrates aspects with respect to a FT 101. Details of the concept of FTs 101 are described, e.g., in Vesely, W. E., Goldberg, F. F., Roberts, N. H., Haasl, D. F.: "F T Handbook" U S Nuclear Regulatory Commission (1981). The FT 101 can be used to model the failure behavior of a system in the various examples described herein. The FT, thus, may facilitate safety assurance. The failure behavior may be used in order to test whether the system may operate safely. The failure behavior may be used in order to identified drawbacks of the design of a system.

The FT 101 is represented by a graph including nodes (illustrated in FIG. 1 by the geometrical shapes) and edges (illustrated in FIG. 1 by the lines between geometrical shapes).

As illustrated in FIG. 1, the FT 101 includes basic events 111, 112, modeled by respective nodes; these basic events form inputs of the FT 101. The basic events may correspond to operational failure events, i.e., may take a logical TRUE or logical FALSE depending on whether there is a failure event. An operational failure event may correspond to some defect of the operation of the system which is modeled by the FT 101. For example, an operational failure event may correspond to the malfunctioning of an electronic components such as a resistor or a switch. For example, an operational failure event may correspond to the malfunctioning of a valve such as a pressure release valve, etc. For example, an operational failure event may correspond to malfunctioning of a cooling system. There are numerous possibilities of the kind and type of malfunction modeled by the operational failure event; the given examples are only illustrative examples and a wide variety of different kinds and types of operational failure events are conceivable.

The FT 101 also includes input ports 113, 114, forming further inputs of the FT 101. The input ports 113, 114 may receive a failure state from one or more further nodes of a further FT (not illustrated in FIG. 1).

The FT 101 also includes Boolean operators 115, 116. Boolean operator 115 is implemented as a logical OR combination of the states of the operational failure event 111 and the input port 113; while Boolean operator 116 is implemented as a logical AND combination of the states of the operational failure event 112 and the input port 114. Besides AND and OR operations, other operations are possible such as NAND or XOR.

The Boolean operators 115, 116 are associated with respective elements 131, 132 of the FT 101.

Thus, based on the FT 101, it is possible to model the failure propagation path of a failure event, e.g., of the operational failure events 111 and 112. In particular, it can be checked whether the failure propagation path of the failure event influences the state of one or more top ports 117, 118, i.e., the outputs of the FT 101.

In FIG. 1, the FT 101 is defined independently of the various components of the system. In other examples, it is possible to define FTs where individual elements and interconnections of the FT are associated with one or more components of the modeled system, i.e., to use a CFT. Such a CFT is illustrated in FIG. 2.

Figure 2:
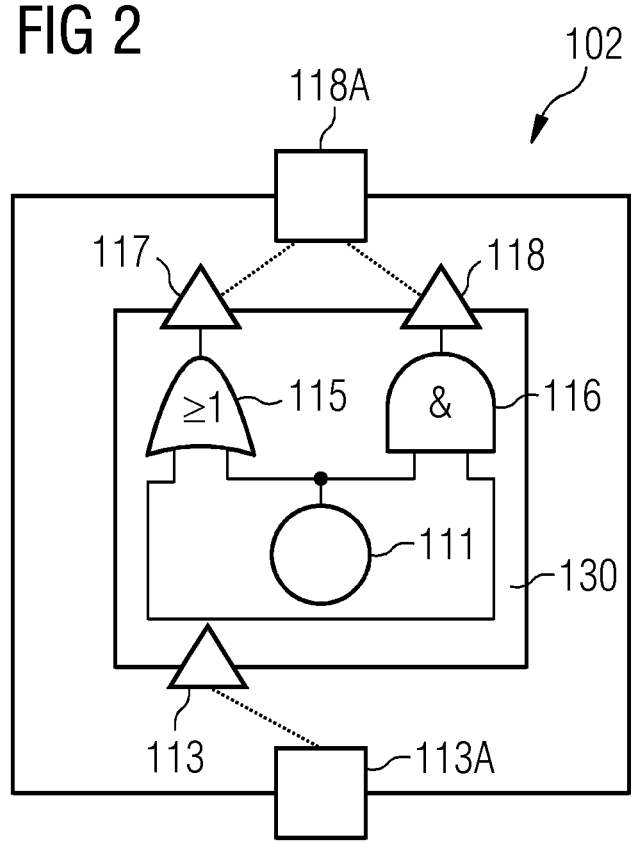

FIG. 2 illustrates aspects with respect to a CFT 102. The CFT 102—in a manner comparable to the FT 101—is represented by a graph including nodes (illustrated in FIG. 2 by the geometrical shapes) and edges (illustrated in FIG. 1 by the lines between geometrical shapes).

Again, the CFT includes an operational failure event 111, input ports 113, 113A, Boolean operators 115, 116, and top ports 117, 118, 118A. In the example of FIG. 2, the entire CFT 102 is associated with a single element 130; the element 130 corresponds to a component of the system. Hence, a mapping is provided between different nodes and interconnections of the graph implementing the CFT 102 on the one hand side, and the various components of the system (in FIG. 2, for sake of simplicity, only a single component is represented by the element 130, albeit generally multiple components may be modeled by multiple elements).

Such a mapping between different nodes and interconnections of the graph implementing the CFT 102 on the one hand side, and the various components of the system on the other hand side enables to model internal operational failure states associated with components of the system and to analyze the failure propagation path of an operational failure state throughout the system on component level. This facilitates predicting whether certain components of the system will be affected by a system failure state. Generally, the CFT enables to associate specific top events to the corresponding ports where the failures can appear. For example, in FIG. 2, the operational failure event associated with the top port 117 will appear on system level at port 118A. This facilitates increased maintainability of the safety analysis model.

Generally, a CFT 102 may be transformed to a classic FT 101—and vice versa. This may be done by removing the various elements 130 and any duplicate ports such as the top port 118A and the input port 113A in the example of FIG. 2.

Figure 3:
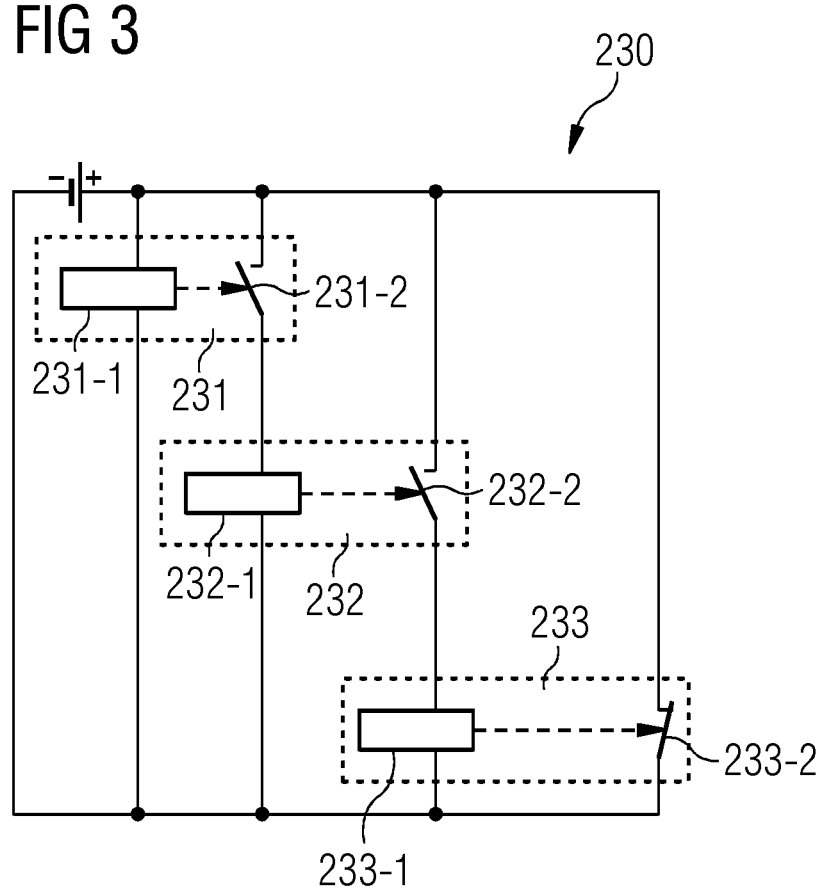

FIG. 3 illustrates aspects with respect to a multi-component control or actuator system 230. In the example of FIG. 3, the system 230 includes a plurality of components 231-233 in the form of switches or relays. Also illustrated are actuators 231-1, 232-1, 233-1 for the switches 231-233 and switching elements 231-2, 232-2, 233-2. The switches 231-233 are arranged in a cascaded manner such that, e.g., upon closing switching element 231-2 switch 232 is actuated. For example, the switches 231-233 could be implemented by transistors or relays. The switches 231, 232 may be normally opened; while the switch 233 may be normally closed. FIG. 3 is a circuit diagram of the system 230.

Due to the cascaded arrangement of the switches 231-233, a failure of, e.g., the switch 232, will also affect the operation of switch 233. This is reflected by a corresponding failure propagation path of an associated CFT.

FIG. 4 illustrates aspects with respect to a CFT 102. In particular, FIG. 4 illustrates the CFT 102 which models the system 230 according to FIG. 3. The CFT 102 includes elements 131-133 corresponding to the components 231-233, i.e., the switches in the example of FIGS. 3 and 4. Each element 131-133 has an input port 113 and a top port 117. Furthermore, each element 131-133 is associated with an operational failure event 111. The operational failure events 111 correspond to malfunctioning of the respective component 231-233.

A system failure state is characterized by the participating operational failure events and the associated failure propagation path. For example, different system failure states may be associated with different top events: top event 118A may correspond to a given system failure state of a plurality of system failure states. In the example of FIG. 4, the system failure state of the top event 118A may be triggered by any one of the operational failure events 111 of the elements 131-133. For exemplary purposes, the failure propagation path 170 associated with the operational failure event 111 of the element 131 is illustrated in FIG. 4 (dashed line in FIG. 4).

In some examples, the CFT 102 may be generated automatically based on the circuit diagram of the system 230. Generally, the circuit diagram includes interconnected electrical components (such as the switches 231-233 in the example of FIG. 3). And, thus, it is possible to automatically extract the information to create the CFT 102 to appropriately model the system 230. Example techniques of modeling the system 230 by means of the CFT 102 are described in Zeller, M., Höfig, K.: INSiDER: "Incorporation of system and safety analysis models using a dedicated reference model." 2016 Annual Reliability and Maintainability Symposium (RAMS) (2016) pp. 1-6. Thereby, for each component/switch 231-233 of the system 230, an element 131-133 is created in the CFT 102. The interconnections of the CFT 102 follow the electrical traces of the circuit diagram. See Möhrle, F., Zeller, M., Hfig, K., Rothfelder, M., Liggesmeyer, P.: "Automating compositional safety analysis using a failure type taxonomy for CFTs." Walls, L., Revie, M., Bedford, T. (eds.) Risk, Reliability and Safety: Innovating Theory and Practice: Proceedings of ESREL 2016. pp. 1380-1387 (2016). Thereby, the CFT 102 may be determined fully automatically, e.g., if the elements 131-133 are predefined for each type of electronic component within the system 230.

FIG. 5 illustrates aspects with respect to a CFT 102. The CFT 102 of FIG. 5 corresponds to the CFT of FIG. 4. In the example of FIG. 5, back-tracing of the failure propagation path 170 is illustrated. Here, starting from the top port 118A as an output of the CFT 102, links 501-503 of the failure propagation path 170 are expanded. The link 501 is between the output of the CFT 102, i.e., the top port 118A and the top-most element 233; the link 502 is between the element 233 and the element 232; and the link 502 is between the element 232 and the element 231.

Due to the linear structure of the CFT 102 in the example of FIGS. 4 and 5, there is only a single failure propagation path 170; in general, there may be multiple failure propagation paths 170 which may or may not have some overlap.

FIG. 6 illustrates aspects with respect to a device 501.

The device 501 includes a human machine interface (HMI) 502. For example, the HMI may be configured to receive information from a user and/or to output information to a user. For example, the HMI may include one or more of the following: a keyboard; a mouse; loudspeakers; voice control; a monitor; etc. The HMI 502 is optional.

The device 501 further includes a processor 503, e.g., a multicore processor. The processor 503 is configured to receive program code from a memory 504, e.g., a nonvolatile memory. The processor 503 is configured to execute the program code. Executing the program code can cause the processor 503 to perform techniques as described herein, e.g., with respect to: modeling a multicomponent control or actuator system using a FT, e.g., a CFT; back-tracing failure propagation paths of the FT; identifying ring closures; replacing ring closures by a predefined expression.

The device 501 further includes an interface 505. For example, control data may be output via the interface 505. For example, it may be possible to control the operation of a multi-component control or actuator system by means of control data which is transmitted via the interface 505. The interface 505 is optional.

FIG. 7 is a flowchart of a method according to various examples. For example, the method according to the flowchart of FIG. 7 may be executed by the processor 503 of the device 501.

In box 1001, a system—such as a multi-component control or actuator system or another type of system which includes hardware and/or software components—is modeled using a FT, such as a CFT. The FT, such as the CFT, may be defined by a graph including nodes and edges. Some of the nodes may correspond to basic events of the FT, such as the CFT.

Operational failure events associated with malfunctioning of one or more components of the system are defined within the FT, such as the CFT. This may include assigning operational failure events to at least some elements of a plurality of elements of the CFT.

Next, in box 1002, failure propagation paths are back-traced from an output of the FT towards one or more inputs of the FT. Hence, the failure propagation paths may be followed from top level to bottom level of the FT. This may be implemented iteratively, by iteratively expanding links towards the root of the FT, i.e., towards one or more inputs of the FT.

Next, in box 1003, it is checked for the various failure propagation paths if the respective failure propagation path forms a ring closure.

If a ring closure is identified, the ring closure is optionally removed. This is achieved by replacing the ring closure with a predefined expression. The FT can be adapted accordingly.

If a ring closure is not identified, then no action needs to be taken.

An example implementation of boxes 1002 and 1003 is illustrated in FIG. 8.

FIG. 8 is a flowchart of a method according to various examples. FIG. 8 illustrates aspects with respect to back-tracing failure propagation paths. Boxes 1011-1013 can correspond to an example implementation of box 1002 of FIG. 7.

FIG. 8 illustrates an iterative approach. Box 1011 triggers multiple iterations. At box 1011 it is checked whether a failure propagation path—e.g., of a previous iteration or started at a top port of the FT—has reached a bottom port, i.e., an input of the FT. In the affirmative, there are no more links to be expanded for the failure propagation paths; the back-tracing is completed; and the method ends at box 1012. Otherwise, the method proceeds at box 1013.

At box 1013, one or more links of the failure propagation path are expanded. The links are expanded in the direction opposing the directivity of the failure propagation path. Hence, box 1013 corresponds to back-tracing the failure propagation path.

The links are expanded across interconnections of the FT (cf. FIG. 5, where the links 501-503 are expanded across the interconnections between the nodes 118A, 233-231).

In FIG. 8, for each iteration, the check is performed if the respective link forms a ring closure. For example, it can be checked if the newly-expanded link completes the ring closure.

FIG. 8 also illustrates such aspects with respect to identifying ring closures, i.e., with respect to checking if a failure propagation path forms a ring closure. Specifically, boxes 1014 and 1015 correspond to the respective box 1003 of FIG. 7.

To facilitate identifying ring closures, at box 1014, the link expanded at 1013 is expressed as a logical combination. This can use A1-A6. In more general terms, each link is expressed as an equation of one or more input values of the respective input element of the link (e.g., in the example of FIG. 5, the link 502 could be expressed in terms of the input value of element 232). Then, this equation is interlinked or substituted into the corresponding equation of the preceding link of the failure propagation path, i.e., the link of the preceding iteration. This yields a combined equation for the overall back-traced failure propagation path. The combined equation describes the output of the overall back-traced failure propagation paths in terms of the values of the lower elements.

Then, at box 1015, any ring closure formed at least partly by the current link is identified. This can include analyzing the combined equation of box 1015. Specifically, it can be checked whether one or more values appear at both sides of the combined equation. This can happen where a downstream element of the failure propagation path has a dependency of its output value on an output value of an upstream element of the failure propagation path. The elements of the failure propagation path correspond to the elements of the CFT 102.

Finally, in box 1016, any identified ring closure is removed. This can include replacing the ring closure by a predefined expression. Specifically, the dependency of the output value downstream element of the failure propagation path on the output value of an upstream element can be replaced by a logical combination of a predefined Boolean expression—e.g., logical TRUE or logical FALSE—and an input value of the downstream element. This is what is provided for by A7 and A8.

The particular Boolean expression to use and/or the particular logical combination to use can be selected depending on the logical combination of the output value of the downstream element and the output value of the upstream element. For example, A7 corresponds to an OR-combination; while A8 corresponds to an AND-combination. In more general terms, the predefined expression used for replacing the ring closure can be selected depending on a coupling type of the ring closure with the failure propagation path, e.g., logical AND- and OR-combinations as in A7 and A8 or more complex couplings.

Next, an example will be described with respect to the following FIGS.

FIG. 9 illustrates an example CFT 102. The CFT 102 includes multiple elements 401-411. FIG. 9 also illustrates the Boolean operations 115, 116 associated with the elements 401-411, i.e., Boolean OR and Boolean AND. FIG. 9 also illustrates input ports 111 that take certain values, e.g., depending on whether a failure state is present or not.

FIG. 9 also illustrates the initial links 501, 502 expanded to back-trace failure propagation paths throughout the CFT 102.

FIGS. 10-14 then illustrate the iterative expansion of further links 503-510, wherein only a single failure propagation path 550 is fully illustrated throughout for sake of simplicity. The failure propagation path 550 is formed by links 501,503,506,507,508,510.

For the CFT 102 of FIGS. 9-14, the following dependencies between adjacent elements are obtained. These correspond to equations of each individual link 501-510.

For System 2 as depicted in FIG. 2 the formalism is:

$$X_1 = X_2 \vee X_3 \quad (9.1)$$

$$X_2 = X_4 \wedge X_5 \quad (9.2)$$

$$X_3 = b_1 \quad (9.3)$$

$$X_4 = X_6 \vee X_7 \quad (9.4)$$

$$X_5 = X_8 \vee X_9 \quad (9.5)$$

$$X_6 = b_2 \quad (9.6)$$

$$X_7 = X_1 \wedge X_1 \wedge X_5 \quad (9.7)$$

$$X_8 = X_4 \wedge X_{11} \wedge X_1 \quad (9.8)$$

$$X_9 = b_3 \quad (9.9)$$

$$X_10 = g_1 \quad (9.10)$$

$$X_11 = g_2 \quad (9.11)$$

For example, links 508, 509 are described by equation 9.5.

Using this, the back-tracing can be executed as follows:

$$X_1 = (X_2 \vee X_3)$$

$$\stackrel{10.1}{\Longrightarrow} (X_1 = X_2) \vee (X_1 = X_3$$

$$\stackrel{10.2}{\Longrightarrow} (X_{2,1} = X_4 \wedge X_5) \vee (X_{3,1} = b_1)$$

$$\stackrel{10.3}{\Longrightarrow} ((X_{4,2,1} = X_6 \vee X_7) \wedge (X_{5,2,1} = X_8 \vee X_9)) \vee b_1$$

$$\stackrel{10.4}{\Longrightarrow} (((X_{6,4,2,1} = b_2) \vee (X_{7,4,2,1} = X_1 \wedge X_{10} \wedge X_5)) \wedge$$
$$((X_{8,5,2,1} = X_4 \wedge X_{11} \wedge X_1) \vee (X_{9,5,2,1} = b_3))) \vee b_1$$

$$\stackrel{10.5}{\Longrightarrow} ((b_2 \vee (\theta \wedge (X_{10,7,4,2,1} = g_1) \wedge (X_{5,7,4,2,1} = X_8 \vee X_9))) \wedge$$
$$(((X_{4,8,5,2,1} = X_6 \vee X_7) \wedge (X_{11,8,5,2,1} = g_2) \wedge (\theta)) \vee b_3)) \vee b_1$$

$$\stackrel{10.6}{\Longrightarrow} ((b_2 \vee (\theta) \wedge g_1 \wedge ((X_{8,5,7,4,2,1} = X_4 \wedge X_{11} \wedge X_1) \vee (X_{9,5,7,4,2,1} = b_3)))) \wedge$$
$$((((X_{6,4,8,5,2,1} = b_2) \vee (X_{7,4,8,5,2,1} = X_1 \wedge X_{10} \wedge X_5)) \wedge g_2 \wedge \theta) \vee$$
$$b_3)) \vee b_1$$

$$\stackrel{10.7}{\Longrightarrow} ((b_2 \vee (\theta \wedge g_1 \wedge ((\theta \wedge (X_{11,8,5,7,4,2,1} = g_2) \wedge \theta) \vee b_3))) \wedge$$
$$(((b_2 \vee (\theta \wedge (X_{10,7,4,8,5,2,1} = g_1) \wedge \theta)) \wedge g_2 \wedge \theta) \vee b_3)) \vee b_1$$

$$\stackrel{10.8}{\Longrightarrow} ((b_2 \vee (\theta \wedge g_1 \wedge ((\theta \wedge g_2 \wedge \theta) \vee b_3))) \wedge$$
$$(((b_2 \vee (\theta \wedge g_1 \wedge \theta)) \wedge g_2 \wedge \theta) \vee b_3)) \vee b_1$$

$$\stackrel{10.9}{\Longrightarrow} ((b_2 \vee (\theta \wedge g_1 \wedge (g_2 \vee b_3))) \wedge (((b_2 \vee g_1) \wedge g_2 \wedge \theta) \vee b_3)) \vee b_1$$

$$\stackrel{10.10}{\Longrightarrow} ((b_2 \vee (g_1 \wedge (g_2 \vee b_3))) \wedge (((b_2 \vee g_1) \wedge g_2) \vee b_3)) \vee b_1$$

For example, the transition 10.2 corresponds to expanding the links 501, 503 and interlinking the respective equations 9.1 and 9.2.

The second term after expansion 10.4 $X_{7,4,2,1} = X_1 \wedge X_{10} \wedge X_5$ corresponds to a ring closure 601 (cf. FIG. 9). This is because the combined equation interlinking the respective equations includes the output value of element 401 $X_1$ on both sides.

As will be appreciated, by inserting the neutrality operator after transition 10.5 and applying A8, the ring closure is replaced by a respective predefined expression.

Summarizing an algorithm is described that is in $O(n^2)$ able to remove arbitrary circular logics from FTS. With this algorithm, automatically generated architectures can easily be analyzed for safe function without any other additional information than ordinary FT information. The here presented algorithm provides thereby the fundamental enabling technology for digitalized design processes of safety critical systems.

Although embodiments of the invention have been shown and described with respect to certain preferred embodiments, equivalents and modifications will occur to others skilled in the art upon the reading and understanding of the specification. The embodiments include all such equivalents and modifications and is limited only by the scope of the appended claims.

For illustration, while above various examples have been described in connection with a CFT, the CFT is not germane for the functioning of the described techniques. The various examples may also be implemented using an ordinary FT. Here, it may not be required to discriminate between different components with which certain diagnostic failure events are associated. Rather, the diagnostic failure events may be embedded into the architecture of the FT depending on their logical arrangement in the modeled system.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A computer-implemented method, comprising:
    modeling, by at least one computer processor, a multi-component control or actuator system using a fault tree, the fault tree comprising a plurality of elements associated with components of the system and a plurality of interconnections between elements of the plurality of elements associated with functional dependencies between the components,
    back-tracing, by the at least one computer processor, a plurality of failure propagation paths from an output of the fault tree towards one or more inputs of the fault tree, and
    for each one of the plurality of failure propagation paths:
        checking, by the at least one computer processor, if the respective failure propagation path forms a ring closure and, in the affirmative, replacing the ring closure by a predefined expression.

2. The method of claim 1, wherein the back-tracing comprises: iteratively expanding links of each failure propagation path of the plurality of failure propagation paths across at least one further interconnection of the fault tree and, for each iteration of the iteratively expanding, performing the checking if the respective link forms the ring closure.

3. The method of claim 2, further comprising:
    expressing an output of each link as an equation between of at least one input value of the input element of the respective link and at least one output value of the respective link, and
    interlinking the equation of the expanded link with the respective equation of the link expanded in the preceding iteration, to yield a combined equation for the respective failure propagation path.

4. The method of claim 3, wherein the checking comprises checking if the combined equation comprises at least one value on both sides of the combined equation.

5. The method of claim 1, wherein the checking comprises, for each one of the plurality of failure propagation paths: identifying a downstream element of the failure propagation path having a dependency of its output value on an output value of an upstream element of the failure propagation path.

6. The method of claim 5, wherein replacing the ring closure comprises: replacing the dependency of the output value of the downstream element by a logical combination of a predefined Boolean expression and an input value of the downstream element.

7. The method of claim 6, further comprising:
    selecting at least one of the logical combination and the predefined Boolean expression depending on a further logical combination of the output value of the downstream element on the output value of the upstream element.

8. The method of claim 1, further comprising:
    selecting the predefined expression from a plurality of candidate expressions depending on a coupling type of the ring closure with the failure propagation path.

9. The method of claim 1, wherein the multi-component control or actuator system comprises a closed-loop control circuitry associated with a ring closure of the fault tree.

10. The method of claim 1, wherein the predefined expression is not derived from the architecture of the multi-component control or actuator system.

11. The method of claim 1, wherein the predefined expression is not derived from the architecture of the multi-component control or actuator system.

12. The method of claim 1, further comprising at least one of:
    determining, using the plurality of failure propagation paths with the predefined expression, whether the multi-component control or actuator system is operating safely; and
    determining, using the plurality of failure propagation paths with the predefined expression, drawbacks of a design of the multi-component control or actuator system.

13. A device comprising at least one processor configured to perform a method comprising:
    modeling a multi-component control or actuator system using a fault tree, the fault tree comprising a plurality of elements associated with components of the system and a plurality of interconnections between elements of the plurality of elements associated with functional dependencies between the components,
    back-tracing a plurality of failure propagation paths from an output of the fault tree towards one or more inputs of the fault tree, and
    for each one of the plurality of failure propagation paths:
        checking if the respective failure propagation path forms a ring closure and, in the affirmative, replacing the ring closure by a predefined expression.

14. The device of claim 13, wherein the predefined expression is not derived from the architecture of the multi-component control or actuator system.

15. The device of claim 13, wherein the predefined expression is an expression that avoids the ring closure and still models failure behavior of the multi-component control or actuator system.

16. The device of claim 13, the method further including at least one of:
    determining, using the plurality of failure propagation paths with the predefined expression, whether the multi-component control or actuator system is operating safely; and
    determining, using the plurality of failure propagation paths with the predefined expression, drawbacks of a design of the multi-component control or actuator system.

* * * * *